(12) United States Patent
Jacob et al.

(10) Patent No.: US 7,994,253 B2
(45) Date of Patent: Aug. 9, 2011

(54) TRANSLUCENT PROPYLENE-BASED ELASTOMERIC COMPOSITIONS

(75) Inventors: Sunny Jacob, Seabrook, TX (US); Gary K. Lawrence, Akron, OH (US); Edward John Blok, Wadsworth, OH (US); Ralph E. Raulie, Akron, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 740 days.

(21) Appl. No.: 12/103,346

(22) Filed: Apr. 15, 2008

(65) Prior Publication Data

US 2009/0258209 A1 Oct. 15, 2009

(51) Int. Cl.
*C08K 5/00* (2006.01)
*B32B 27/32* (2006.01)
(52) U.S. Cl. ........................ 524/515; 428/220
(58) Field of Classification Search .................... 524/515
See application file for complete search history.

(56) References Cited

U.S. PATENT DOCUMENTS

| | | | |
|---|---|---|---|
| 4,603,158 A * | 7/1986 | Markham et al. | 524/100 |
| 5,115,030 A | 5/1992 | Tanaka et al. | |
| 6,147,160 A | 11/2000 | Wang et al. | |
| 7,094,837 B1 * | 8/2006 | Ellul et al. | 525/193 |
| 2005/0131142 A1 | 6/2005 | Datta et al. | |
| 2006/0100377 A1 | 5/2006 | Ouhadi | |
| 2006/0235159 A1 * | 10/2006 | Datta et al. | 525/240 |
| 2007/0117899 A1 | 5/2007 | Ouhadi | |
| 2008/0032079 A1 | 2/2008 | Sahnoune et al. | |
| 2009/0115108 A1 * | 5/2009 | Rodgers et al. | 264/331.15 |
| 2009/0143531 A1 | 6/2009 | Ouhadi et al. | |

FOREIGN PATENT DOCUMENTS

| | | |
|---|---|---|
| EP | 1 772 487 | 4/2007 |
| WO | WO 2007/082571 | 7/2007 |
| WO | WO 2008/016518 | 2/2008 |

OTHER PUBLICATIONS

B. E. Lindenmuth, "Chapter 1, An overview of tire technology," The Pneumatic Tire, National Highway Traffic Safety Administration, Feb. 2006, pp. 2-9 (www.nhtsa.dot.gov; DOT HS 810 561).
M. Morton ed., "Carbon Black Properties Vs. Compound Properties," Rubber Technology Third Edition, Chapman & Hall, London 1995, pp. 71-77,80,82-83.

* cited by examiner

*Primary Examiner* — Ling-Siu Choi
*Assistant Examiner* — Hui Chin
(74) *Attorney, Agent, or Firm* — Kevin M. Faulkner

(57) ABSTRACT

A composition is described in one aspect as comprising one or more propylene-α-olefin terpolymers; wherein the propylene-α-olefin terpolymer(s) possess a melting temperature ($T_m$) within the range of from less than 105° C., and a heat of fusion ($H_f$) within the range of from less than 75 J/g; one or more polyolefin(s); and oil; wherein fillers are present, if at all, at a level that maintains a Haze value of 65% or less for the composition. The terpolymer in one embodiment is a polymer comprising at least 65 wt %, by weight of the terpolymer, of propylene-derived units, within the range of from 5 to 35 wt % of ethylene or other α-olefin and a diene such as ethylidiene norbornene, and in certain embodiments having a Mooney Viscosity (ML(1+4)@125° C.) within the range of from 10 to 50 (ASTM D1646). The compositions can be cured to form transparent or translucent articles such as sheets that are also flexible.

15 Claims, No Drawings

TRANSLUCENT PROPYLENE-BASED ELASTOMERIC COMPOSITIONS

FIELD OF THE INVENTION

The present invention relates in general to translucent elastomeric compositions, and relates more specifically to thermoplastic/rubber compositions and thermoplastic vulcanizates that include, as the rubber component, a propylene-based terpolymer having attributes of a rubber.

BACKGROUND OF THE INVENTION

Compositions comprising rubbers such as ethylene-propylene-diene rubber are most often opaque, even as relatively thin films. This is due in part to the necessary presence of opacity-inducing fillers (talc, clay, etc) in the rubber or rubber compositions, as well as the inherent incompatibility between additives such as polypropylene and the ethylene-rich rubber, having a significant refractive index difference and thus creating haze. Fillers such as talc are necessary in part because most EPDM rubbers are gummy and/or fluid and cannot be pelletized for easy feeding to the melt-blender. Thus, what is typically done in the industry is the EPDM is sold as a large bail, and the bail is shredded at the site of its compounding. Fillers are then added to the EPDM to allow for a controlled feeding of amounts of the EPDM to melt-blending devices.

What would be useful are elastomeric compositions that are transparent or translucent. Such compositions exist, such as styrenic block copolymer based compositions or urethane-based compositions, but these can be expensive. It would be desirable to use less expensive polyolefin-based materials in making a translucent composition.

Some translucent polyolefin-based compositions have been disclosed in US Patent Publication No. 2008/0032079, U.S. Pat. No. 7,094,837, U.S. Pat. No. 6,147,160, U.S. Pat. No. 5,115,030, and U.S. Pat. No. 4,603,158. Some of these publications solve the problem of having an elastic, strong and translucent composition by using a high ethylene-content EP rubber in a blend with polypropylene to form a blend or cured to form a vulcanizate (TPV). These can lack desirable properties such as low Compression Set, high elasticity, and, due at least to the thermoplastic/ethylene-rubber incompatibility, some haze or lack of translucence. The inventors have solved these and other problems herein.

SUMMARY OF THE INVENTION

In one aspect is a composition comprising (a) one or more propylene-α-olefin terpolymers; wherein the propylene-α-olefin terpolymer(s) possess (i) a melting temperature ($T_m$) of less than 105° C., and (ii) a heat of fusion ($H_f$) of less than 75 J/g; (b) one or more polyolefin(s); and (c) oil; wherein fillers are present, if at all, at a level that maintains a Haze value of 65% or less for the composition. Haze is measured according to ASTM 1003-00. The composition can be formed into a thermoplastic vulcanizate that is translucent.

Alternately, in another aspect is a composition comprising (a) one or more propylene-α-olefin terpolymers; wherein the propylene-α-olefin terpolymer(s) possess (i) a melting temperature ($T_m$) of less than 105° C., and (ii) a heat of fusion ($H_f$) of less than 75 J/g; (b) one or more polyolefin(s); and (c) oil; wherein opacity-inducing fillers are substantially absent.

The terpolymer in one embodiment is a polymer comprising at least 65 wt %, by weight of the terpolymer, of propylene-derived units, and within the range of from 5 to 35 wt % of ethylene or other α-olefin derived units, and diene derived units such as ethylidiene norbornene; and in certain embodiments the terpolymer possesses a Mooney viscosity (ML(1+4)@125° C.) within the range of from 10 or 12 or 14 to 28 or 30 or 50 (ASTM D1646). The terpolymer can be described by its various properties (e.g., Mooney viscosity, heat of fusion, etc.), alone or in any combination as disclosed herein.

As will be understood by those skilled in the art, the various descriptive elements of these and other aspects of the invention can be combined with the various embodiments of the elements as described herein.

DETAILED DESCRIPTION OF THE INVENTION

Described herein is a curable composition, or multiple compositions, comprising one or more propylene-α-olefin terpolymers (or "terpolymer"), one or more polyolefin(s), and one or more oils ("oil"); wherein fillers are present, if at all, at a level and/or of such an identity that the clarity of the composition (and the clarity of articles made therefrom) is maintained and the composition and/or article is at least translucent. In one embodiment, fillers are present in an identity and/or amount which maintains a Haze value of 65% or less, or 60% or less, for the composition. In certain embodiments, the composition is translucent or transparent, preferably translucent, either in its cured or uncured state.

In certain embodiments, opacity-inducing fillers are substantially absent from the composition (or from articles made therefrom). By "substantially absent", what is meant is that opacity-inducing fillers are present, if at all, in an amount of less than 1 wt % of the composition, and from less than 0.5 wt % of the composition in another embodiment, and not present in any detectable amount in yet another embodiment. "Opacity-inducing fillers" are fillers that make the composition in which they are added opaque (Haze value of from greater than 65% as measured by ASTM 1003-00) either by their identity or the amount added, in compounded sheets of from 1 to 5 mm or more. Non-limiting examples of opacity-inducing fillers include talc, carbon black, clay, untreated silica and alumina, zinc oxide, mica, asbestos, barites, kieselguhr, magnesium carbonate and mixtures thereof.

In certain embodiments, all fillers are substantially absent from the composition (or articles made therefrom), meaning that any filler is present, if at all, in an amount of less than 1 wt % of the composition, and from less than 0.5 wt % of the composition in another embodiment, and not present in any detectable amount in yet another embodiment. "Fillers" are particulate or fibrous materials that do not dissociate to a molecular level in the diluent to which they are added, but are maintained in their original physical form and include "opacity-inducing fillers" and "clarity-maintaining fillers" as described herein; diluents include molten polymers as well as aqueous, polar or non-polar liquids.

In another embodiment, styrenic copolymers and terpolymers are substantially absent, meaning that the styrenic copolymers or terpolymers are present, if at all, at a level of from less than 1 wt % of the composition, and from less than 0.5 wt % of the composition in another embodiment, and not present in any detectable amount in yet another embodiment.

In one aspect of the invention, the composition or thermoplastic vulcanizate consists essentially of one or more propylene-α-olefin terpolymers, one or more polyolefin(s), and one or more oils ("oil"). The composition (or article made therefrom) of this embodiment may also include minor components such as a cure composition, antioxidants, etc., preferably to a level no greater than 5 wt %, and no greater than 3 wt % in another embodiment, based upon the weight of the entire composition or TPV.

The "propylene-α-olefin terpolymers" described herein are terpolymers of propylene-derived units, one or more units derived from ethylene or a $C_4$-$C_{10}$ α-olefin and one or more diene-derived units. The comonomer content of the terpolymer is from 5 to 35 wt % in one embodiment. In one embodiment the terpolymer has a MWD (Mw/Mn) within the range of from 1.5 to 20, a heat of fusion ($H_f$) within the range of from less than or equal to 75 J/g, and a peak melting temperature ($T_m$) within the range of from less than or equal to 105° C. In some embodiments, where more than one comonomer is present, the amount of a particular comonomer may be less than 5 wt %, but the combined comonomer content is preferably greater than 5 wt % and less than 35 wt %, based on the weight of the terpolymer. The propylene-α-olefin terpolymers may be described by any number of different parameters, and those parameters may comprise a numerical range made up of any desirable upper limit with any desirable lower limit as disclosed herein for the propylene-α-olefin terpolymers.

In certain embodiments, the α-olefins are selected from ethylene, 1-butene, 1-hexene and 1-octene, and from ethylene in a particular embodiment. The propylene-α-olefin terpolymer comprises from 5 to 25 wt % monomer-derived units in one embodiment, and from 5 to 20 wt % in another embodiment, and from 5 to 16 wt % in yet another embodiment, and from 6 to 18 wt % in yet another embodiment, and from 8 to 20 wt % in yet another embodiment.

In one embodiment, the propylene-α-olefin terpolymer comprises less than or equal to 10 wt % diene derived units (or "diene"), and less than or equal to 5 wt % diene in another embodiment, and less than or equal to 3 wt % diene in another embodiment, and from greater than 0.1 wt % in yet another embodiment, and within the range of from 0.1 to 5 wt % in yet another embodiment, and from 0.1 to 3 wt % in yet another embodiment, and from 0.1 to 2 wt % diene in yet a more particular embodiment. Suitable dienes include, for example: 1,4-hexadiene, 1,6-octadiene, 5-methyl-1,4-hexadiene, 3,7-dimethyl-1,6-octadiene, dicyclopentadiene (DCPD), ethylidiene norbornene (ENB), norbornadiene, 5-vinyl-2-norbornene (VNB), and combinations thereof. The diene, if present, is most preferably ENB. In a particular embodiment, the comonomers are ethylene and ENB or VNB, and thus the propylene-α-olefin terpolymer is a propylene-ethylene-ethylidiene norbornene terpolymer or a propylene-ethylene-5-vinyl-2-norbornene terpolymer.

In certain embodiments, the propylene-α-olefin terpolymers have a triad tacticity of three propylene units, as measured by $^{13}$C NMR, of 75% or greater, 80% or greater, 82% or greater, 85% or greater, or 90% or greater. In one embodiment, the triad tacticity is within the range of from 50 to 99%, and from 60 to 99% in another embodiment, and from 75 to 99% in yet another embodiment, and from 80 to 99% in yet another embodiment; and from 60 to 97% in yet another embodiment. Triad tacticity is determined as follows: The tacticity index, expressed herein as "m/r", is determined by $^{13}$C nuclear magnetic resonance (NMR). The tacticity index m/r is calculated as defined by H. N. Cheng in 17 MACROMOLECULES 1950 (1984). The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 an atactic material. An isotactic material theoretically may have a ratio approaching infinity, and many by-product atactic polymers have sufficient isotactic content to result in ratios of greater than 50. Embodiments of the propylene-α-olefin terpolymer have a tacticity index m/r ranging from a lower limit of 4 or 6 to an upper limit of 8 or 10 or 12.

In certain embodiments, the propylene-α-olefin terpolymers have a heat of fusion ($H_f$), determined according to the Differential Scanning Calorimetry (DSC) procedure described herein, greater than or equal to 0.5 or 1 or 5 J/g, and is less than or equal to 75 J/g, and less than or equal to 70 J/g in another embodiment, and less than or equal to 50 J/g in yet another embodiment, and less than or equal to 35 J/g in yet another embodiment. In certain embodiments, the $H_f$ value is within the range of from 10 to 75 J/g, and from 20 to 70 J/g in another embodiment, and from 30 to 60 J/g in yet another embodiment, and from 30 to 75 J/g in yet another embodiment.

In certain embodiments, the propylene-α-olefin terpolymers have a percent crystallinity within the range of from 0.5 to 40%, and from 1 to 30% in another embodiment, and from 5 to 25% in yet another embodiment, wherein "percent crystallinity" is determined according to the DSC procedure described herein. (The thermal energy for the highest order of polypropylene is estimated at 189 J/g; i.e., 100% crystallinity is equal to 189 J/g). In another embodiment, the propylene-α-olefin terpolymer of the present disclosure has a crystallinity of less than 40%, and from 0.25 to 25% in another embodiment, and from 0.5 to 22% in yet another embodiment, and from 0.5 to 20% in yet another embodiment.

In certain embodiments, the propylene-α-olefin terpolymers have a single peak melting transition as determined by DSC; in certain embodiments the propylene-α-olefin terpolymer has a primary peak melting transition with a broad end-of-melt transition. The peak "melting point" ($T_m$) is defined as the temperature of the greatest heat absorption within the range of melting of the sample. However, the propylene-α-olefin terpolymer may show secondary melting peaks adjacent to the principal peak, and or the end-of-melt transition, but for purposes herein, such secondary melting peaks are considered together as a single melting point, with the highest of these peaks being considered the $T_m$ of the propylene-α-olefin terpolymer. The propylene-α-olefin terpolymers have a peak melting temperature ($T_m$) less than or equal to 70 or 80 or 90 or 100 or 105° C. in one embodiment; and within the range of from 25 to 100° C. in yet another embodiment, and from 25 to 85° C. in yet another embodiment, and from 25 to 75° C. in yet another embodiment, and from 25 to 65° C. in yet another embodiment, and from 30 to 80° C. in yet another embodiment, and from 30 to 70° C. in yet a more particular embodiment.

The procedure for DSC determinations is as follows. About 0.5 grams of polymer was weighed out and pressed to a thickness of about 15-20 mils (about 381-508 microns) at about 140° C.-150° C., using a "DSC mold" and Mylar™ as a backing sheet. The pressed pad was allowed to cool to ambient temperature by hanging in air (the Mylar was not removed). The pressed pad was annealed at room temperature (about 23-25° C.) for about 8 days. At the end of this period, an about 15-20 mg disc was removed from the pressed pad using a punch die and was placed in a 10 microliter aluminum sample pan. The sample was placed in a differential scanning calorimeter (Perkin Elmer Pyris 1 Thermal Analysis System) and was cooled to about −100° C. The sample was heated at about 10° C./min to attain a final temperature of about 165° C. The thermal output, recorded as the area under the melting peak of the sample, is a measure of the heat of fusion and can be expressed in Joules per gram (J/g) of polymer and was automatically calculated by the Perkin Elmer System. Under these conditions, the melting profile shows two (2) maxima, the maxima at the highest temperature was taken as the melting point within the range of melting of the sample relative to a baseline measurement for the increasing heat capacity of the polymer as a function of temperature.

In certain embodiments, the propylene-α-olefin terpolymers have a density within the range of from 0.850 to 0.920 g/cm³, and from 0.870 to 0.900 g/cm³ in another embodiment, and from 0.880 to 0.890 g/cm³ in yet another embodiment, the values measured at room temperature per the ASTM D-1505 test method.

In certain embodiments, the propylene-α-olefin terpolymers have a melt flow rate ("MFR", ASTM D1238, 2.16 kg, 230° C.), equal to or greater than 0.2 dg/min. In certain embodiments, the MFR is from 0.5 to 5000 dg/min and from 1 to 2500 dg/min in another embodiment, and within the range of from 0.5 to 1500 dg/min in yet another embodiment, and from 2 to 1000 dg/min in yet another embodiment, and from 5 to 500 dg/min in yet another embodiment, and from 10 to 250 dg/min in yet another embodiment, and from 10 to 100 dg/min in yet another embodiment, and from 2 to 40 dg/min in yet another embodiment, and from 2 to 30 dg/min in yet another embodiment, and from 0.5 to 10 dg/min in yet another embodiment.

In certain embodiments, the propylene-α-olefin terpolymers have a Mooney viscosity value [ML (1+4)@(125° C.] as determined according to ASTM D1646, of less than 100, and less than 75 in another embodiment, and less than 60 in yet another embodiment, and less than 30 in yet another embodiment, and from greater than 8 in yet another embodiment, and within the range of from 8 to 60 in yet another embodiment, and within the range of from 10 to 50 in yet another embodiment, and within the range of from 10 to 30 in yet another embodiment. In yet another embodiment, the propylene-α-olefin terpolymers possess an Elongation at Break (ASTM D 412) of less than 2000%, and less than 1000% in another embodiment, and less than 800% in yet another embodiment, and greater than 400% in yet another embodiment, and greater than 500% in yet another embodiment.

In certain embodiments, the propylene-α-olefin terpolymers have a Mw value within the range of from 5,000 to 5,000,000 g/mole, and from 10,000 to 1,000,000 in another embodiment, and from 50,000 to 400,000 in yet another embodiment. In another embodiment, the propylene-α-olefin terpolymers have a Mn value within the range of from 2,500 to 2,500,000 g/mole, and from 10,000 to 250,000 in yet another embodiment, and from 25,000 to 200,000 in yet another embodiment. In yet another embodiment, the propylene-α-olefin terpolymers have a Mz value within the range of from 10,000 to 7,000,000 g/mole, and from 80,000 to 700,000 in another embodiment, and from 100,000 to 500,000 in yet another embodiment.

In certain embodiments, the molecular weight distribution (MWD) of the propylene-α-olefin terpolymers is within the range of from 1.5 to 20, and from 1.5 to 15 in another embodiment, and from 1.5 to 5 in yet another embodiment, and from 1.8 to 5 in yet another embodiment, and from 1.8 to 3 or 4 in particular embodiments.

Techniques for determining the molecular weight (Mn, Mz and Mw) and molecular weight distribution (MWD) are as follows, and as in Verstate et al. in 21 MACROMOLECULES 3360 (1988). Conditions described herein govern over published test conditions. Molecular weight and molecular weight distribution are measured using a Waters 150 gel permeation chromatograph equipped with a Chromatix KMX-6 on-line light scattering photometer. The system was used at 135° C. with 1,2,4-trichlorobenzene as the mobile phase. Showdex™ (Showa-Denko America, Inc.) polystyrene gel columns 802, 803, 804 and 805 are used. This technique is discussed in LIQUID CHROMATOGRAPHY OF POLYMERS AND RELATED MATERIALS III 207 (J. Cazes ed., Marcel Dekker, 1981). No corrections for column spreading were employed; however, data on generally accepted standards, e.g., National Bureau of Standards Polyethylene 1484 and anionically produced hydrogenated polyisoprenes (an alternating ethylenepropylene terpolymer) demonstrate that such corrections on Mw/Mn or Mz/Mw are less than 0.05 units. Mw/Mn was calculated from an elution time-molecular weight relationship whereas Mz/Mw was evaluated using the light scattering photometer. The numerical analyses can be performed using the commercially available computer software GPC2, MOLWT2 available from LDC/Milton Roy-Riviera Beach, Fla.

The propylene-α-olefin terpolymers can include terpolymers prepared according to the procedures in WO 02/36651, U.S. Pat. No. 6,992,158, and/or WO 00/01745. Preferred methods for producing the propylene-α-olefin terpolymers are found in US Patent Application Publication 2004/0236042 and U.S. Pat. No. 6,881,800. Preferred propylene-α-olefin terpolymers are available commercially under the trade names Vistamaxx™ (ExxonMobil Chemical Company, Houston, Tex., USA) and Versify™ (The Dow Chemical Company, Midland, Mich., USA), certain grades of Tafiner™ XM or Notio™ (Mitsui Company, Japan) or certain grades of Softel™ (Basell Polyolefins of the Netherlands).

The compositions described herein comprise within the range of from 10 to 50 wt %, by weight of the composition, of the propylene-α-olefin terpolymer(s), and from 15 to 40 wt % in another embodiment. If cured or partially cured, the compositions comprise within the range of from 10 to 50 wt %, by weight of the composition, of the cured or partially cured propylene-α-olefin terpolymer(s), and from 15 to 40 wt % in another embodiment. In the compositions described herein, there can be one or more different terpolymer(s) present, "different" meaning that each of the terpolymers may have distinct properties (within the limitation(s) that are claimed) such as comonomer content, density, $T_m$, $H_f$, etc.

In compositions that comprise a cured or partially cured terpolymer, the composition can be called a "thermoplastic vulcanizate" (TPV). A TPV comprises one or more thermoplastics and one or more curable polymers (or "rubber"), at least one curable polymer of which is at least partially cured. In the current invention, the one or more propylene-α-olefin terpolymer(s) are the "rubber" or curable polymer. In aspects of the present invention, the thermoplastic and terpolymer are dynamically vulcanized. As used herein, the term "dynamic vulcanization" means vulcanization or curing of at least one curable polymer, curable rubber in a particular embodiment, blended with at least one thermoplastic under conditions of shear and/or temperatures sufficient to plasticize the mixture. A "fully vulcanized" (or fully cured or fully crosslinked) rubber can be characterized in one embodiment by a given percentage range of the crosslinkable rubber that is extractable in boiling xylene or cyclohexane, for example, 5 wt % or less, or 4 wt % or less, or 3 wt % or less, or 2 wt % or less, or 1 wt % or less. A polymer composition is partially cured when the extractables are greater than 5 wt %. In certain embodiments of the invention, the terpolymer of the TPV comprises within the range of from 10 to 50 wt %, by weight of the total terpolymer, of uncured terpolymer, and from 15 to 40 wt % in another embodiment, and from 20 to 35 wt % in another embodiment. The percentage of extractable rubber can be determined by the technique set forth in U.S. Pat. No. 4,311,628, and the portions of that patent referring to that technique. The TPV may comprise other additives as described herein.

The thermoplastic in one embodiment is a polyolefin. In the compositions described herein, there can be one or more different polyolefins present, "different" meaning that each of the polyolefins may have distinct properties (within the limitation(s) that are claimed) such as primary monomer content, comonomer content, density, $T_m$, etc.

In one embodiment, the polyolefin(s) can be described as having a Flexural Modulus, 1% (ASTM D 790B, 13 mm/min) within the range of from greater than 500 MPa, and greater than 1000 MPa in another embodiment, and greater than 1500 MPa in yet another embodiment, and between 1000 and 4000 MPa in yet another embodiment. Examples of suitable polyolefins include polyethylene and polypropylene, homopolymers and copolymers. More particularly, non-limiting examples of suitable polyolefins includes low density polyethylene, linear low density polyethylene, medium density polyethylene, high density polyethylene, plastomers (ethylene-based copolymers or terpolymers having a density of less than 0.90 g/cm³) propylene homopolymers, polypropylene random copolymers, propylene block copolymers, polypropylene impact copolymers, and blends thereof. In a particular embodiment, the polyolefin that makes up part of the compositions herein is polypropylene, which can be a random copolymer, homopolymer, or blends of one or more of each. The thermoplastic makes up within the range of from 10 to 40 wt %, by weight of the composition, in one embodiment, and from 15 to 30 wt % in another embodiment.

In the embodiment that includes polypropylene as the "polyolefin," the melt flow rate (ASTM D 1239, 230° C., 2.16 kg) of the polypropylene is within the range of from 0.1 to 20 dg/min in one embodiment, and from 0.3 to 15 dg/min in yet another embodiment, and from 0.5 to 6 dg/min in yet another embodiment. When the polypropylene is a random copolymer, it comprises from 0.2 to 10 wt %, based on the weight of the random copolymer, of ethylene and/or $C_4$ to $C_{10}$ α-olefin, and from 0.5 to 5 wt % in another embodiment. In a particular embodiment, the comonomer of the random copolymer is ethylene.

For purposes of curing, the composition may comprise within the range of from 0.1 to 3 wt % of a curative composition. The curative composition can comprise any combination or single compound known to be useful in curing curable rubbers such as sulfur compounds, peroxides, azides, and other free-radical initiators, phenolic resins, silanes, etc., each with metal catalysts or other accelerators as is known in the art. In one embodiment, the compositions are cured using a cure composition comprising an organic peroxide. Most preferred organic peroxides include di-tert-butyl peroxide, dicumyl peroxide, t-butylcumyl peroxide, α,α-bis(tert-butylperoxy) diisopropyl benzene, 2,5-dimethyl-2,5-di(t-butylperoxy)hexane (DBPH), 1,1-di(tert-butylperoxy)-3,3,5-trimethyl cyclohexane, n-butyl-4,4-bis(tert-butylperoxy) valerate, benzoyl peroxide, lauroyl peroxide, dilauroyl peroxide, 2,5-dimethyl-2,5-di(tert-butylperoxy)hexyne-3, diaryl peroxides, ketone peroxides, peroxydicarbonates, peroxyesters, dialkyl peroxides, hydroperoxides, peroxyketals, benzoyl peroxide, dichlorobenzoyl peroxide, dicumyl peroxide, 2,5-dimethyl-2,5-di-(tert-butyl-peroxy)-hexyne-(3), 2,5-dimethyl-2,5-di-(tert-butyl-peroxy)-hexane-(3), di-tertiary-butyl peroxide. The criteria for choosing an appropriate free-radical initiator are known to persons skilled in the art and are described in U.S. Pat. No. 3,646,155. Preferably, the organic peroxide free-radical initiator is added in an amount within the range of from 0.1 to 1.0 wt % of the propylene-α-olefin terpolymer, more preferably from 0.05 to 0.2 wt %. It can be neat, or in solution in a diluent such as oil, or a solid blend. Stated another way, the amount of curative preferably comprises within the range of from $1 \times 10^{-4}$ moles to $2 \times 10^{-2}$ moles, more preferably from $2 \times 10^{-4}$ moles to $2 \times 10^{-3}$ moles, and even more preferably from $7 \times 10^{-4}$ moles to $1.5 \times 10^{-3}$ moles per 100 parts by weight of the terpolymer.

The cure composition, when present, may include an acrylate-containing compound ("acrylate") in one embodiment. In one embodiment, the acrylate is a compound selected from structures $CH_2CR^1(R^2)$, wherein $R^1$ is selected from hydrogen and $C_1$ to $C_{10}$ alkyls; and $R^2$ is selected from $—OOCR^3$ groups and $—COOR^3$ groups; and wherein $R^3$ is selected from hydrogen, $C_1$ to $C_{10}$ alkyls, $—OOCR^3$ groups and $—COOR^3$ groups; wherein the acrylate can comprise from 1 to 10 $—OOCR^3$ groups and $—COOR^3$ groups. The acrylate can be any compound that comprises at least one acrylate or acetate functional group in another embodiment. Examples of suitable acrylates include trimethylolpropane trimethacrylate, trimethylolbutane trimethacrylate, and other methacrylate-containing compounds. When present, the acrylate is present as part of the composition within the range of from 0.1 to 3 wt % of the composition in one embodiment, and from 0.2 to 2 wt % of the composition in another embodiment.

Other cure agents for use with the primary cure agent or alone are triallylcyanurate, triallyl isocyanurate, triallyl phosphate, sulfur, N-phenyl-bis-maleamide, zinc diacrylate, zinc dimethacrylate, divinylbenzene, 1,2-polybutadiene, trimethylolpropane trimethacrylate, tetramethyleneglycoldiacrylate, trifunctionalacrylic ester, dipentaerythritolpentacrylate, polyfunctional acrylate, retarded cyclohexane dimethanol diacrylate ester, polyfunctional methacrylates, acrylate and methacrylate metal salts, oximer for e.g., quinone dioxime. In order to maximize the efficiency of peroxide/coagent crosslinking the mixing and dynamic vulcanization are preferably carried out in a nitrogen atmosphere.

The composition disclosed herein includes one or more oils, or "oil". The term "oil" is defined herein to include both "process oils" and "extender oils" and blends thereof, and each of those terms is defined herein in accordance with the broadest definition or usage of that term in any issued patent or publication. For example, extender oils include a variety of hydrocarbon oils and also include certain plasticizers (e.g., ester plasticizers). In an illustrative composition and/or TPV, an additive oil can be present in amounts within the range of from 10 or 15 or 20 to 45 to 50 to 55 wt %, by weight of the composition. Many additive oils are derived from petroleum fractions, and have particular ASTM designations depending on whether they fall into the class of paraffinic (e.g., Paralux™ (Chevron)), naphthenic, or aromatic oils. Other types of additive oils which can be used in the compositions and TPVs herein synthetic oils such as are alpha olefinic oils (e.g., Elevast™ from ExxonMobil Chemical Co.) and liquid polybutylene. The type of additive oil utilized may be that customarily used in conjunction with a particular rubber component. The ordinarily skilled chemist will recognize which type of oil should be used with a particular polymer, and also be able to determine the amount (quantity) of oil. Additive oils other than petroleum based oils can be used also, such as oils derived from coal tar and pine tar, as well as synthetic oils, e.g., polyolefin materials (e.g., Nexbase™, supplied by Fortum Oil N.V.). Examples of plasticizers that are often used as additive oils are organic esters and synthetic plasticizers. Certain commercially available rubber components (e.g., EPDMs) include additive oil that is preblended before the rubber component is combined with the thermoplastic.

Certain fillers, "clarity-maintaining fillers", may be present in the compositions (or articles made therefrom). As used herein, "clarity-maintaining fillers" are fillers that do not create opacity (Haze value of greater than 65%) in the compositions and/or cured compositions when present. Non-limiting examples of clarity-maintaining fillers include calcium carbonate, fumed silica and silane treated silica, other "treated" silicas, hydrotalcite, nano-sized titanium oxide, nano-sized zirconium oxide, and combinations thereof, as are known in the art. When present, such fillers exist in the compositions from 0.1 to 25 wt %, based on the weight of the composition or TPV in certain embodiments, and from 0.1 to 20 wt % in another embodiment, and from 0.5 to 10 wt % in yet another embodiment, and from 0.1 to 3 wt % in yet another embodiment, and from less than 20 wt % in yet another embodiment, and from less than 15 wt % in yet another embodiment, and less than 10 wt % in yet another embodiment, and less than 5 wt % in yet another embodiment, and less than 3 wt % in yet another embodiment. In certain embodiments, when calcium carbonate is present in the compositions, it is an ultrafine grade having an average particle size ranging from 0.03 to 0.2 μm. In certain embodiments, the "nano-sized" titanium and zirconium oxides have an average particle size ranging from 0.1 or 10 nm to 80 or 100 nm. The "treated silicas" in one embodiment have an average particle size ranging from less than 30 nm in one embodiment, and within the range of from 5 to 30 nm in another embodiment; and an absorbed water level of less than 3 or 2 or 1 wt %, based on the weight of the treated silica. In certain embodiments, all fillers are substantially absent; including "clarity-maintaning" fillers.

The melt blending of the composition to form an un-cured composition or TPV takes place in a melt-blending device. The melt-blending device, or "extruder," useful in the present invention can take on any form such as Banbury or Braybender melt-blenders, or single, double, or multiple screw extruders as is known in the art. The extruder in one embodiment is a device that can melt-blend the components in the extruder within the range of from 120° C. to the decomposition temperature of the component that decomposes at the lowest temperature; and from 120° C. or 150° C. to 260° C. in another embodiment, and from 150° C. or 170° C. to 225° C. or 250° C. in yet another embodiment.

Described another way, the extruder is a device that can melt-blend the components at a shear rate within the range of from 2000 to 8000 s$^{-1}$, and a shear rate of from 2500 to 7500 s$^{-1}$ in another embodiment, and from 4000 to 7000 s$^{-1}$ in yet another embodiment, and from 5000 to 8000 s$^{-1}$ in yet another embodiment.

In one embodiment, the extruder is a single screw-type extruder having one or more barrels combined in sequence, forming a cavity with at least one screw running there through, and where any one or more of the barrels may have an addition point for polymers, additives, and cure agents. In another embodiment, the screw-type extruder is made from one or more segments that have addition points along its length. The individual barrels may be separately heated; or the distinct regions and/or segments of the screw-type extruder can be heated in another embodiment. In one embodiment, the screw-type extruder has length to diameter ratio within the range of from 50 to 5, and from 40 to 10 in another embodiment, and from 30 to 15 in yet another embodiment. Stable pellets can be made of the compositions, which can then be further processed to form the sheet and/or articles.

The compositions described herein can be formed by melt-blending the desired components, added together simultaneously or sequentially in any order. The thermoplastic vulcanizates can also be prepared by melt-blending in any order, the polyolefin(s), the rubber phase (terpolymer), curative(s), and other ingredients (plasticizer, oil, filler, stabilizer, etc.) in a mixer heated to above the melting temperature of the polyolefin thermoplastic. The optional fillers, plasticizers, antioxidants, etc., can be added at this stage or later. After sufficient molten-state mixing to form a well mixed blend, vulcanizing agents (also known as curatives or crosslinkers) are generally added.

In some embodiments it is preferred to add the cure agent in solution with a liquid, for example rubber processing oil, or in a masterbatch which is compatible with the other components. It is convenient to follow the progress of vulcanization by monitoring mixing torque or mixing energy requirements during mixing. The mixing torque profile, or mixing energy profile, generally goes through a maximum after which mixing can be continued somewhat longer to improve the fabricability of the blend or vulcanizate. If desired, one can add some of the ingredients after the dynamic vulcanization is complete but before the melt leaves the melt-blending device.

The composition formed into a thermoplastic vulcanizate possesses an Elongation value of from greater than 300% or 350% or 400% in certain embodiments. The compression set of the TPVs is within the range of from 30 to 60 (22 hr, 70° C.) in one embodiment, and is greater than 30 in another embodiment. The LCR viscosity of the TPV's are less than 90 in one embodiment, and less than 80 in another embodiment, and less than 70 in yet another embodiment, and within the range of from 20 to 80 in yet another embodiment. The oil swell (24 hrs, 121° C.) is greater than 210% in one embodiment and greater than 220% in another embodiment, and is within the range of from 220 to 500% in yet another embodiment. The Mooney viscosity of the TPVs is within the range of from 10 to 100 (Shore A) in one embodiment, and from 30 to 70 in another embodiment. The compositions and/or TPVs described herein possess a Haze value (ASTM 1003-00) of less than 65 or 60 or 55%, and within a range of from 20 to 65% in yet another embodiment. The test methods for these parameters are described below.

The composition and/or thermoplastic vulcanizate made from the composition can be made into any desirable article. In one embodiment, a translucent sheet within the range of from 0.01 or 0.1 to 3 or 4 mm thickness made from the compositions described herein. The sheet can be used to make any number of other articles. The sheets and/or articles are formed in one embodiment by first forming a thermoplastic vulcanizate from the composition by combining the components as described herein (polyolefin, terpolymer and oil), and further comprising the steps of melt blending the components, combining the components with a curative, and optionally combining additional oil; and finally isolating a thermoplastic vulcanizate having an Elongation value greater than 300% or 350% or 400%. The thermoplastic vulcanizate can be blow molded, extruded, injection molded, thermo-formed, elasto-welded and/or compression molded into an article in certain embodiments.

These compositions or TPVs are also useful for making a variety of other articles, especially applications that need clarity, general examples of which include overmolding of other metal or plastic products having writing underneath including cap liners, cell phones, video game controls, MP3 devices and other hand-held electronic device covers or overmolding; and elastic fibers and nonwoven articles made therefrom such as diapers, where good elastic recovery is an important attribute. They are also particularly useful for making articles by blow molding, extrusion, injection molding, thermo-forming, elasto-welding and compression molding techniques. In addition, these TPVs can be used for making vehicle parts, such as but not limited to, weather seals, brake parts including, but not limited to cups, coupling disks, diaphragm cups, boots such as constant velocity joints and rack and pinion joints, tubing, sealing gaskets, parts of hydraulically or pneumatically operated apparatus, o-rings, pistons, valves, valve seats, and valve guides.

Examples of the Invention

Example compositions were made that comprised a propylene-α-olefin terpolymer and polypropylene, among other components as shown in Table 2. Table 1 shows some of the properties of the rubber and terpolymer components. The propylene-α-olefin terpolymer (αPP) and ethylene-propylene-diene rubber (EPDM) each comprise either ethylidiene norbornene derived units (ENB) as the "diene" or 5-vinyl-2-norbornene derived units (VNB). EPDM(1) is commercially available Vistalon™ 2504 (ExxonMobil). EPDM(2) is oil extended non-commercial grade of ethylene-propylene-diene rubber with 100 phr oil, and has a Mn of 198,000 g/mol, and a Mw of 504,000 g/mol. Advantageously, the αPPs were in stable, pellet form, thus allowing for it to be used without the need for talc, filler, or other substances that are typically used for EPDM which must be in bale form and blended with a solid filler to improve its flowability.

TABLE 1

Properties of the Terpolymers and Rubbers Used

| Sample | Mooney ML(1 + 4), 125° C. | MFR, dg/min (230° C., 2.16 kg) | $C_2$ content, wt % | Diene content, wt % |
|---|---|---|---|---|
| αPP(1) | 18 | 4 | 16 | ENB, 2.4 |
| αPP(2) | 26 | 1.5 | 16 | ENB, 2.6 |
| αPP(3) | 16 | 3.2 | 16 | ENB, 2.4 |
| EPDM(1) | 25 | — | 57.5 | ENB, 4.7 |
| EPDM(2) | 50 | — | 63 | VNB, 9 |

Two comparative (1 and 2), and seven inventive compositions (3-9) were tested, those compositions shown in Table 2. The polypropylenes used were a random polypropylene copolymer (rPP) PP9852E1 (ExxonMobil Chemical Co), and a polypropylene homopolymer (hPP) F008F (Sunoco). Paralux 6001 is the "oil", and was added before and after the cure in certain embodiments. The organic peroxide was Varox™ DBPH-50-WO (in oil) (R.T. Vanderbilt). The "acrylate" was Sartomer™ 350 trimethylolpropane trimethacrylate (Sartomer). A small amount of "hydrotalcite" was added to samples 3 and 9, DHT-4A. Finally, some other additives were also added to samples 3 and 9 as shown in Table 2. Irganox 1035 (antioxidant and heat stabilizer) was from Ciba Specialty Chemicals, and Ultranox 626 (an antioxidant) from Crompton.

The compositions were prepared by melt blending in a Brabender-type blender. The mixing was performed at 180° C. at 100 rpm in presence of a nitrogen blanket. The pellets of terpolymer and polyolefin were charged into the Brabender first along with the acrylate, then the first portion of the plasticizer oil was added. These components were mixed for about 3 minutes to obtain a homogenous blend as indicated by the torque on the Brabender. The peroxide was then added carefully and mixing was continued for 2 minutes. At the end the remaining amount of oil plasticizer was added and mixing continued for another 2 minutes before the blend was discharged. The blends were then molded into 2 mm thick pads with 12 cm×14 cm dimensions on compression molding press. The compression molded pads were used for testing.

The homogenized samples were molded under compression into film on a Carver hydraulic press for analysis. About 25 grams of the homogenized vulcanizate were molded between brass platens lined with aluminum foil. A 0.033 inch (0.08 cm) thick chase with a square opening 4 inch×4 inch (10.2×10.2 cm) was used to control sample thickness. After one minute of preheat at 170° C. or 180° C., under minimal pressure, the hydraulic load was gradually increased to 10,000 to 15,000 lbs, at which it was held for three minutes. Subsequently the sample and molding plates were cooled for three minutes under 10,000 to 15,000 lbs load between the water-cooled platens of the press. Plaques were allowed to equilibrate at room temperature for a minimum of 24 hours prior to physical property testing. Test results are outlined in Table 3. The test methods are as follows:

Specific Gravity was determined according to ASTM D792.
Shore hardness was determined according to ISO 868 at 23° C. using a Durometer.
Stress-strain properties such as Ultimate Tensile Strength, Ultimate Elongation (or Elongation), and 100% Modulus were measured on 2 mm thick compression molded plaques at 23° C. by using an Instron testing machine according to ISO 37.
Compression set test was measured according to ISO 815A.
Tension set was measured according to ISO 2285.
Oil swell (oil gain) was determined after soaking a die-cut sample from compression molded plaque in IRM No. 3 fluid for 24 hours at 125° C. according to ASTM D 471.
LCR viscosity was measured using Laboratory Capillary Rheometer according to ASTM D 3835-02 using a Dynisco Capillary rheometer at 30:1 L/D (length/diameter) ratio, a shear rate of 1200 l/s and a temperature of 204° C. The entrance angle of the laboratory capillary rheometer is 180°, barrel diameter is 9.55 mm. The heat soak time is 6 minutes.
Haze and Clarity was measured according to ASTM 1003-00.

TABLE 2

Composition Formulations

| Component (wt %) | 1 (comparative) | 2 (comparative) | 3 | 4 | 5 | 6 | 7 | 8 | 9 |
|---|---|---|---|---|---|---|---|---|---|
| αPP (1) | — | — | 38.3 | 38.9 | 38.9 | 38.9 | — | — | — |
| αPP (2) | — | — | — | — | — | — | 38.9 | — | — |
| αPP (3) | — | — | — | — | — | — | — | 38.9 | 38.3 |
| EPDM (1) | 68.1 | — | — | — | — | — | — | — | — |
| EPDM (2) | — | 38.9 | — | — | — | — | — | — | — |
| rPP | — | — | — | — | 19.4 | — | — | — | — |
| hPP | 19.4 | 19.4 | 19.1 | 19.4 | — | 19.4 | 19.4 | 19.4 | 19.1 |
| Oil (before cure) | — | 29.1 | 28.7 | 29.1 | 29.1 | 29.1 | 29.1 | 29.1 | 28.7 |

TABLE 2-continued

Composition Formulations

| Component (wt %) | 1 (comparative) | 2 (comparative) | 3 | 4 | 5 | 6 | 7 | 8 | 9 |
|---|---|---|---|---|---|---|---|---|---|
| Oil (after cure) | 9.7 | 9.7 | 9.6 | 9.7 | 9.7 | 9.7 | 9.7 | 9.7 | 9.6 |
| Organic peroxide | 1.1 | 1.1 | 1.1 | 1.1 | 1.1 | 1.1 | 1.1 | 1.1 | 1.1 |
| acrylate | 1.5 | 1.5 | 1.5 | 1.5 | 1.5 | 1.5 | 1.5 | 1.5 | 1.5 |
| Hydrotalcite | — | — | 0.5 | — | — | — | — | — | 0.5 |
| Irganox 1035 | — | — | 0.5 | — | — | — | — | — | 0.5 |
| Ultranox 626 | — | — | 0.5 | — | — | — | — | — | 0.5 |

TABLE 3

Thermoplastic Vulcanizate Properties

| Component (wt %) | 1 (comparative) | 2 (comparative) | 3 | 4 | 5 | 6 | 7 | 8 | 9 |
|---|---|---|---|---|---|---|---|---|---|
| Specific gravity | 0.8808 | 0.8804 | 0.8846 | 0.8786 | 0.8795 | 0.8801 | 0.8818 | 0.8807 | 0.8845 |
| Hardness, Shore A | 71 | 60 | 64 | 66 | 62 | 62 | 66 | 64 | 65 |
| UTS, psi | 660 | 590 | 830 | 770 | 740 | 760 | 800 | 820 | 810 |
| Elongation, % | 140 | 280 | 570 | 550 | 530 | 500 | 500 | 550 | 550 |
| 100% Modulus, psi | 520 | 330 | 380 | 370 | 340 | 370 | 390 | 380 | 380 |
| Tension Set, % | 8 | 11 | 16 | 16 | 15 | 15 | 16 | 16 | 16 |
| LCR | 98.1 | 108.3 | 79.2 | 42.8 | 36.7 | 37.7 | 40.0 | 26.4 | 64.5 |
| Oil swell, %, 22 hr 70° C. | 109 | 205 | 256 | 247 | 436 | 270 | 234 | 235 | 245 |
| CS, %, 22 hr 70° C. | 22 | 29 | 35 | 38 | 37 | 29 | 38 | 27 | 45 |
| CS, %, 72 hr 70° C. | — | — | 40 | 43 | 42 | — | 46 | — | — |
| CS, %, 72 hr 100° C. | — | — | 37 | 47 | 54 | — | 45 | — | — |
| Haze, % | 100 | — | 55 | 46 | 40 | 48 | 50 | — | — |
| Clarity, % | 16 | — | 64 | 72 | 82 | 67 | 67 | — | — |

The data in Table 4 shows the results of sequential solvent extraction experiments carried out on some of the inventive examples. The first step was to remove the oil plasticizer through a Soxhlet solvent extraction step for 24 hours using an azeoptrope of acetone and cyclohexane in the ratio 2:1 by volume using about 0.5 g of the sample all carried out at about 23° C. In the following steps, cyclohexane and xylene were used as the solvent for Soxhlet extraction. In the cyclohexane solvent extraction, about 0.3 gram of polymer was placed in about 60 ml of cyclohexane to isolate the uncured and lightly branched elastomeric components of the polymer blend. The mixture was continuously stirred at room temperature for about 48 hours. The soluble fraction (referred as cyclohexane solubles) was separated from the insoluble material (referred as cyclohexane insolubles) using filtration under vacuum. The insoluble material was then subjected to the xylene soxhlet extraction procedure. In this step, the insoluble material from the room temperature cyclohexane extraction was first extracted for about 24 hours with xylene. The xylene insoluble portion (referred as xylene insolubles) was recovered by filtration and is the fraction containing the crosslinked polymer. The remaining portion was cooled down to room temperature and retained in a glass container for 24 hours for precipitation. The precipitated component (referred as xylene precipitate) was recovered through filtration and the soluble component (referred as xylene soluble) was recovered by evaporating the xylene solvent. The xylene precipitate fraction is where the thermoplastic crystalline component resides.

Summarizing, the first extraction extracts out the oil of the compositions. Next, the sample was extracted with cyclohexane, extracting out uncured rubber and atactic polypropylene. The next xylene insoluble film extraction, without a filter, extracted any crosslinked rubber in the samples. Finally, the samples were extracted with xylene to extract out the polypropylene. The relatively high level of cyclohexane soluble fraction indicates a low cure state (partial cure).

Qualitatively, it was observed that 1-2 mm thick sheets of the TPVs were translucent, as text could be easily read when placed directly beneath and against the sheets.

TABLE 4

Solvent Extraction

| | Extraction step, % | | | |
|---|---|---|---|---|
| | 3 | 4 | 5 | 7 |
| Azeotrope solubles | 40 | 40 | 40 | 40 |
| Cyclohexane, solubles | 7 | 7 | 8 | 6 |
| Xylene insoluble film without filter | 16 | 16 | 13 | 20 |
| Xylene solubles | 37 | 37 | 39 | 35 |
| Total | 100 | 100 | 100 | 100 |

Having described the invention in its various aspects, in numbered embodiments herein is:
1. A composition comprising:
 (a) one or more propylene-α-olefin terpolymers; wherein the propylene-α-olefin terpolymer(s) possess:
  (i) a melting temperature ($T_m$) of less than 105° C., and
  (ii) a heat of fusion ($H_f$) within the range of from 75 J/g;
 (b) one or more polyolefin(s); and
 (c) oil;

wherein fillers are present, if at all, at a level that maintains a Haze value of 65% or less for the composition.

2. The composition of embodiment 1, wherein the propylene-α-olefin terpolymer(s) also possesses a triad tacticity of three propylene units, as measured by $^{13}$C NMR, within the range of from 75% or greater.

3. The composition of embodiments 1 and 2, comprising within the range of from 10 to 50 wt %, by weight of the composition, of propylene-α-olefin terpolymer.

4. The composition of claim 1, comprising within the range of from 10 to 40 wt %, by weight of the composition, of polyolefin.

5. The composition of any of the preceding numbered embodiments, comprising within the range of from 10 to 50 wt %, by weight of the composition, of oil.

6. The composition of any of the preceding numbered embodiments, wherein the propylene-α-olefin terpolymer(s) comprises within the range of from 8 to 20 wt %, by weight of the propylene-α-olefin terpolymer, of ethylene derived units.

7. The composition of any of the preceding numbered embodiments, wherein the propylene-α-olefin terpolymer(s) comprises within the range of from 11 to 20 wt %, by weight of the propylene-α-olefin terpolymer, of ethylene derived units.

8. The composition of any of the preceding numbered embodiments, wherein the propylene-α-olefin terpolymer(s) comprises within the range of from 0.1 to 6 wt % diene derived units.

9. The composition of any of the preceding numbered embodiments, wherein the propylene-α-olefin terpolymer(s) comprises within the range of from 0.5 to 4 wt % diene derived units.

10. The composition of any of the preceding numbered embodiments, wherein the propylene-α-olefin terpolymer(s) possesses a melt flow rate (ASTM D1238, 2.16 kg, 230° C.) within the range of from 0.2 to 30 dg/min.

11. The composition of any of the preceding numbered embodiments, wherein the propylene-α-olefin terpolymer(s) possesses a melt flow rate (ASTM D1238, 2.16 kg, 230° C.) within the range of from 0.2 to 10 dg/min.

12. The composition of any of the preceding numbered embodiments, wherein the polyolefin(s) is polypropylene.

13. The composition of any of the preceding numbered embodiments, wherein styrenic-copolymers and terpolymers are substantially absent.

14. The composition of any of the preceding numbered embodiments, wherein the propylene-α-olefin terpolymer(s) is partially or fully cured.

15. The composition of embodiment 14, wherein the composition possesses an Elongation value of greater than 300%.

16. The composition of any of the preceding numbered embodiments, wherein opacity-inducing fillers are substantially absent.

17. The composition of any of the preceding numbered embodiments, further comprising fillers selected from the group consisting of clarity-maintaining fillers.

18. The composition of any of the preceding numbered embodiments, wherein all fillers are substantially absent.

19. A translucent sheet within the range of from 0.01 to 4 mm thickness made from the composition of any of the preceding numbered embodiments.

20. A method of forming a thermoplastic vulcanizate by combining the components of any of the preceding numbered embodiments, and further comprising the steps of:
  (1) melt blending the components;
  (2) combining the components with a curative;
  (3) optionally combining additional oil; and
  (4) isolating a thermoplastic vulcanizate having an Elongation value of greater than 300%.

21. The method of embodiment 20, wherein the curative comprises organic peroxide.

22. The method of embodiments 20 and 21, wherein the thermoplastic vulcanizate is blow molded, extruded, injection molded, thermoformed, elasto-welded and/or compression molded into an article.

23. The method of embodiments 20-22, wherein the article is selected from overmolding, hand-held device casings, weather seals, hoses, belts, gaskets, moldings, boots, vehicle parts and elastic fibers.

Another aspect is directed to the use of a composition in forming a thermoplastic vulcanizate, the composition comprising (a) one or more propylene-α-olefin terpolymers; wherein the propylene-α-olefin terpolymer(s) possess (i) a melting temperature ($T_m$) of less than 105° C., and (ii) a heat of fusion ($H_f$) of less than 75 J/g; (b) one or more polyolefin(s); and (c) oil; wherein fillers are present, if at all, at a level equal to or less than that which maintains a Haze value of 65% or less for the composition. Other embodiments are as described above.

Another aspect is directed to the use of a composition in forming a translucent article, the composition comprising (a) one or more propylene-α-olefin terpolymers; wherein the propylene-α-olefin terpolymer(s) possess (i) a melting temperature ($T_m$) of less than 105° C., and (ii) a heat of fusion ($H_f$) of less than 75 J/g; (b) one or more polyolefin(s); and (c) oil; wherein fillers are present, if at all, at a level equal to or less than that which maintains a Haze value of 65% or less for the composition. In certain embodiments, all fillers (opacity-inducing and clarity-maintaining) are substantially absent. Other embodiments are as described above.

What is claimed is:

1. A translucent sheet within the range of from 0.01 to 4 mm thickness made from a composition consisting essentially of:
  (a) one or more propylene-α-olefin terpolymers; wherein the propylene-α-olefin terpolymer(s) possess:
    (i) a melting temperature ($T_m$) of less than 105° C.,
    (ii) a heat of fusion ($H_f$) of less than 75 J/g; and
    (iii) within the range of from 5 to 20 wt %, by weight of the propylene-α-olefin terpolymer, of ethylene or $C_4$ to $C_{10}$ α-olefin derived units;
  (b) one or more polyolefin(s); and
  (c) oil;
  wherein fillers are present, if at all, at a level that maintains a Haze value of 65% or less for the composition, and wherein opacity-inducing fillers are substantially absent.

2. The composition of claim 1, wherein the propylene-α-olefin terpolymer(s) also possesses a triad tacticity of three propylene units, as measured by $^{13}$C NMR, of 75% or greater.

3. The composition of claim 1, comprising within the range of from 10 to 50 wt %, by weight of the composition, of propylene-α-olefin terpolymer.

4. The composition of claim 1, comprising within the range of from 10 to 40 wt %, by weight of the composition, of polyolefin.

5. The composition of claim 1, comprising within the range of from 10 to 50 wt %, by weight of the composition, of oil.

6. The composition of claim 1, wherein the propylene-α-olefin terpolymer(s) comprises within the range of from 8 to 20 wt %, by weight of the propylene-α-olefin terpolymer, of ethylene derived units.

7. The composition of claim 1, wherein the propylene-α-olefin terpolymer(s) comprises within the range of from 11 to 20 wt %, by weight of the propylene-α-olefin terpolymer, of ethylene derived units.

8. The composition of claim 1, wherein the propylene-α-olefin terpolymer(s) comprises within the range of from 0.1 to 6 wt % diene derived units.

9. The composition of claim 1, wherein the propylene-α-olefin terpolymer(s) comprises within the range of from 0.5 to 4 wt % diene derived units.

10. The composition of claim 1, wherein the propylene-α-olefin terpolymer(s) possesses a melt flow rate (ASTM D1238, 2.16 kg, 230° C.) within the range of from 0.2 to 30 dg/min.

11. The composition of claim 1, wherein the propylene-α-olefin terpolymer(s) possesses a melt flow rate (ASTM D1238, 2.16 kg, 230° C.) within the range of from 0.2 to 10 dg/min.

12. The composition of claim 1, wherein the polyolefin(s) is polypropylene.

13. The composition of claim 1, further comprising fillers selected from the group consisting of clarity-maintaining fillers.

14. The composition of claim 1, wherein all fillers are substantially absent.

15. The composition of claim 1, wherein the propylene-α-olefin terpolymer(s) is at least partially cured.

* * * * *